United States Patent
Uchiyama

(10) Patent No.: US 8,559,120 B2
(45) Date of Patent: Oct. 15, 2013

(54) CONTROL APPARATUS AND ADJUSTMENT METHOD FOR VIBRATORY ACTUATOR USING A PLURALITY OF VIBRATORS, VIBRATORY ACTUATOR, AND LENS UNIT AND OPTICAL APPARATUS USING THE VIBRATORY ACTUATOR

(75) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 13/155,281

(22) Filed: Jun. 7, 2011

(65) Prior Publication Data

US 2011/0304933 A1     Dec. 15, 2011

(30) Foreign Application Priority Data

Jun. 9, 2010  (JP) .................. 2010-132134

(51) Int. Cl.
*G02B 7/02* (2006.01)
(52) U.S. Cl.
USPC .......................................... 359/824
(58) Field of Classification Search
USPC .............. 359/694, 696, 824; 310/335, 28
See application file for complete search history.

(56) References Cited

U.S. PATENT DOCUMENTS 6,078,438 A * 6/2000 Shibata et al. ............... 359/819

FOREIGN PATENT DOCUMENTS

| JP | 1-227669 A | 9/1989 |
| JP | 3248545 B2 | 1/2002 |

* cited by examiner

*Primary Examiner* — Joseph P Martinez
(74) *Attorney, Agent, or Firm* — Canon U.S.A., Inc., IP Division

(57) ABSTRACT

A control apparatus is configured to control an actuator, which moves one driven member by a plurality of vibrators, by supplying two alternating-current signals to each vibrator of the actuator. The control apparatus includes a controller configured to acquire a speed characteristic of the driven member corresponding to the frequency of the alternating-current signal with respect to the vibrator(s) based on the acquired speed and the frequency of the alternating-current signal supplied to the vibrator(s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

12 Claims, 10 Drawing Sheets

CONTROL APPARATUS AND ADJUSTMENT METHOD FOR VIBRATORY ACTUATOR USING A PLURALITY OF VIBRATORS, VIBRATORY ACTUATOR, AND LENS UNIT AND OPTICAL APPARATUS USING THE VIBRATORY ACTUATOR

BACKGROUND OF THE INVENTION

1. Field of the Invention

The present invention relates to a control apparatus and an adjustment method for a vibratory actuator configured to actuate one driven member with use of a plurality of vibrators.

2. Description of the Related Art

Conventionally, there has been known a vibratory actuator configured to drive a driven member by causing an elliptic motion at a predetermined mass point. A vibratory actuator has such a characteristic that it can realize high torque drive while generating only low noises. By making use of this characteristic, it is proposed to employ a vibratory actuator configured to drive a circular slider with use of a plurality of vibrators as an actuation means in a lens barrel or the like.

However, if there is a variation among the characteristics of the individual vibrators, a predetermined torque cannot be obtained or the drive characteristic of the actuator may be adversely influenced. Therefore, the characteristics of the individual vibrators need to be adjusted.

In this connection, Japanese Patent Application Laid-Open No. 1-227669 and Japanese Patent No. 3248545 discuss a technique for adjusting the characteristics of a plurality of vibratory actuators. Japanese Patent Application Laid-Open No. 1-227669 discusses a configuration allowing adjustment of a pressure applied between a rotor and a stator so that a plurality of vibratory actuators have a same resonance frequency. On the other hand, Japanese Patent No. 3248545 discusses detection of a difference among outputs of a plurality of vibratory actuators to adjust the characteristics of the plurality of vibratory actuators based on this difference.

Both Japanese Patent Application Laid-Open No. 1-227669 and Japanese Patent No. 3248545 involve an actuator configured to drive one rotor by one stator, and in these cases, it is probably not so difficult to measure the characteristics of the individuals of such vibratory actuators.

However, in the case of an actuator configured to drive one slider by a plurality of vibrators, driving of one vibrator may be insufficient to drive the slider due to a lack of torque power, resulting in a failure to measure the characteristics of the individual vibrators. Therefore, in this case, the characteristics of the individual vibrators should be adjusted before they are installed into the actuator, but it is troublesome and hard to adjust the vibrators and then install them one by one.

SUMMARY OF THE INVENTION

The present invention is directed to a control apparatus and an adjustment method enabling, in a vibratory actuator configured to drive one driven member by a plurality of vibrators, an adjustment of the characteristics of the individual vibrators even after the vibrators are installed into the vibratory actuator.

According to an aspect of the present invention, a control apparatus is configured to control an actuator, which moves one driven member by a plurality of vibrators, by supplying two alternating-current signals to each vibrator of the actuator. The control apparatus includes a controller configured to acquire a speed of the driven member at the time of driving one or more vibrator (s) of the plurality of vibrators while setting the remaining vibrators to standing wave drive, acquire a speed characteristic of the driven member corresponding to the frequency of the alternating-current signal with respect to the vibrator(s) based on the acquired speed and the frequency of the alternating-current signal supplied to the vibrator(s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

According to another aspect of the present invention, a method for adjusting an actuator configured to move one driven member by a plurality of vibrators includes acquiring a speed of the driven member at the time of driving one or more vibrator (s) of the plurality of vibrators while setting the remaining vibrators to standing wave drive, acquiring a speed characteristic of the driven member corresponding to the frequency of the alternating-current signal with respect to the vibrator (s), based on the acquired speed and the frequency of the alternating-current signal supplied to the vibrator (s) at the time of driving the vibrator (s) when the speed is acquired, and reducing a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator based on the acquired characteristic.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
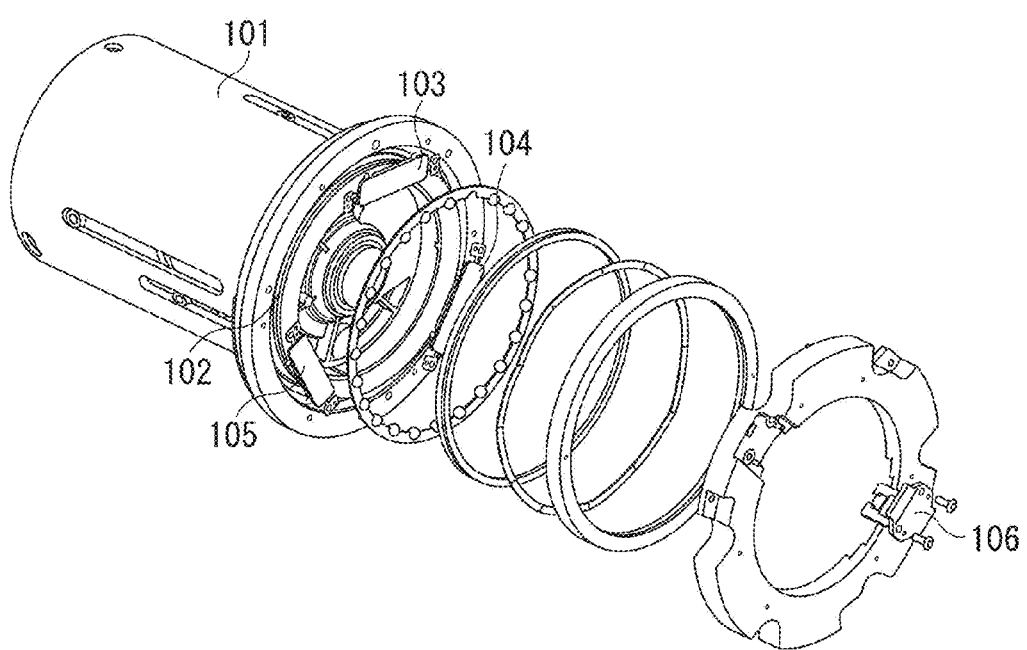
FIG. 1 is a projection view of a lens barrel according to an exemplary embodiment of the present invention.

FIG. 1 is a projection view of a lens barrel according to an exemplary embodiment of the present invention. The lens barrel includes a fixed lens barrel 101, and a cylindrical cam ring having a cam groove formed on the inside thereof. Optical members such as a lens and a diaphragm are disposed within the cam ring. The cam ring is coupled with a slider 102. Various mechanical members are disposed at the slider 102 so as to enable the slider 102 to rotate concentrically around an optical axis. The slider 102 contacts vibrators 103, 104, and 105 and rotates in a concentric direction, which causes the various optical members to move in the optical axis direction owing to the cam groove. Further, a rotational position detection sensor 106, which measures a rotation amount of the slider 102, is installed together with a support member and a rotation assist member. The rotational position detection sensor 106 detects a position of the slider 102, and is constituted by, for example, a linear scale and an encoder.

Figure 2:
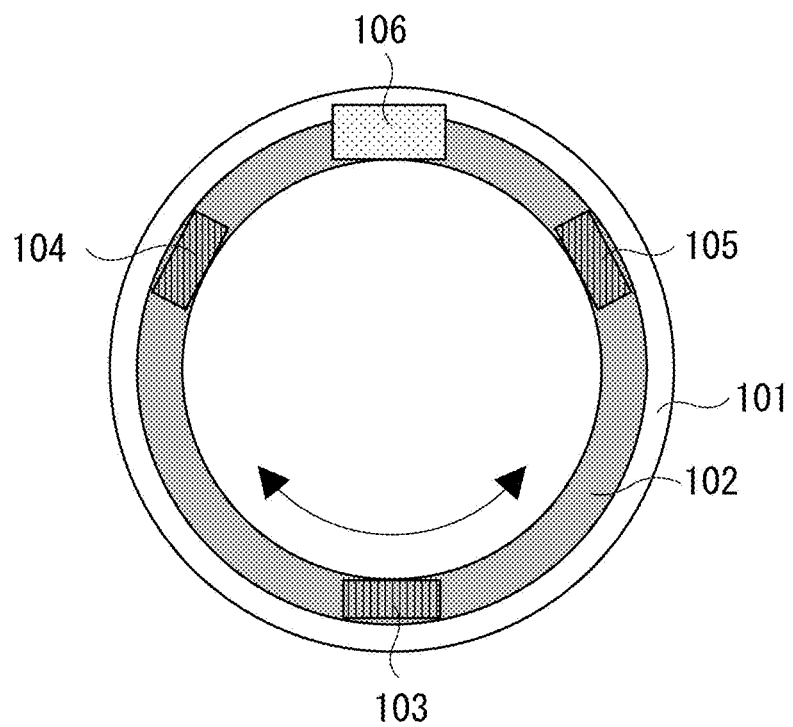
FIG. 2 illustrates a structure of an actuator.

FIG. 2 illustrates a structure of a vibratory actuator, which includes the slider 102, and the vibrators 103, 104, and 105 illustrated in FIG. 1. The slider 102 is driven to rotate by the interaction between the slider 102 and the plurality of vibrators 103, 104, and 105. The rotational position detection sensor 106 detects a rotational position of the slider 102 resulting from the rotation.

Figure 3:
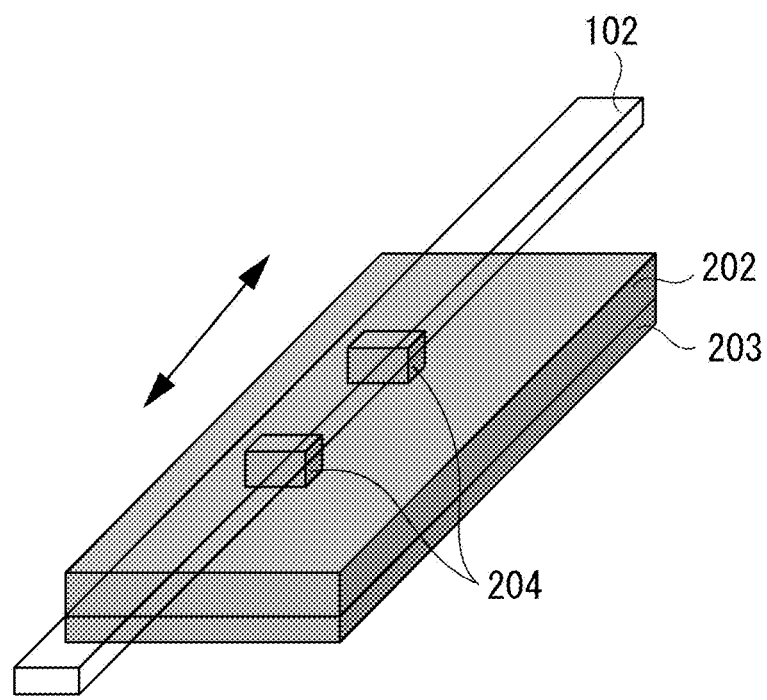
FIG. 3 schematically illustrates a vibrator.

FIG. 3 illustrates a structure of the vibrators 103, 104, and 105. Each vibrator includes an elastic body 202 formed into a rectangular plate and made from a metal material. A piezoelectric element (electricity-mechanical energy conversion element) 203 is joined to the back surface of the elastic body 202. A plurality of protrusions 204 are formed at predetermined positions on the upper surface of the elastic body 202. Two types of alternating-current voltages are applied to the piezoelectric element 203, thereby simultaneously causing a second-order bending vibration in the longitudinal direction of the elastic body 202 and a first-order bending vibration in the lateral direction of the elastic body 202. As a result, an elliptic motion is induced at the protrusion 204. Then, the vibrators 103, 104, and 105 substantially linearly drive the slider 102 with the aid of pressure contact of the slider 102 to the protrusions 204. In other words, a linear vibratory actuator is constituted by the vibrators and the driven member. An arrangement of the vibrators 103, 104, and 105 as illustrated in FIG. 2 can cause a rotation of the elastic body 202. The pressure contact of the slider 102 is realized by magnetizing the slider 102 and using a magnetic attractive force generated between the slider 102 and the metal material of each of the vibrators 103, 104, and 105.

An elliptic motion at the protrusion 204 of the vibrator is caused by applying two alternating-current signals to the piezoelectric element 203. An elliptic motion is changed according to the phase difference between and the frequency of the two alternating-current signals, and this change leads to a change in the movement speed of the slider 102.

Figure 4:
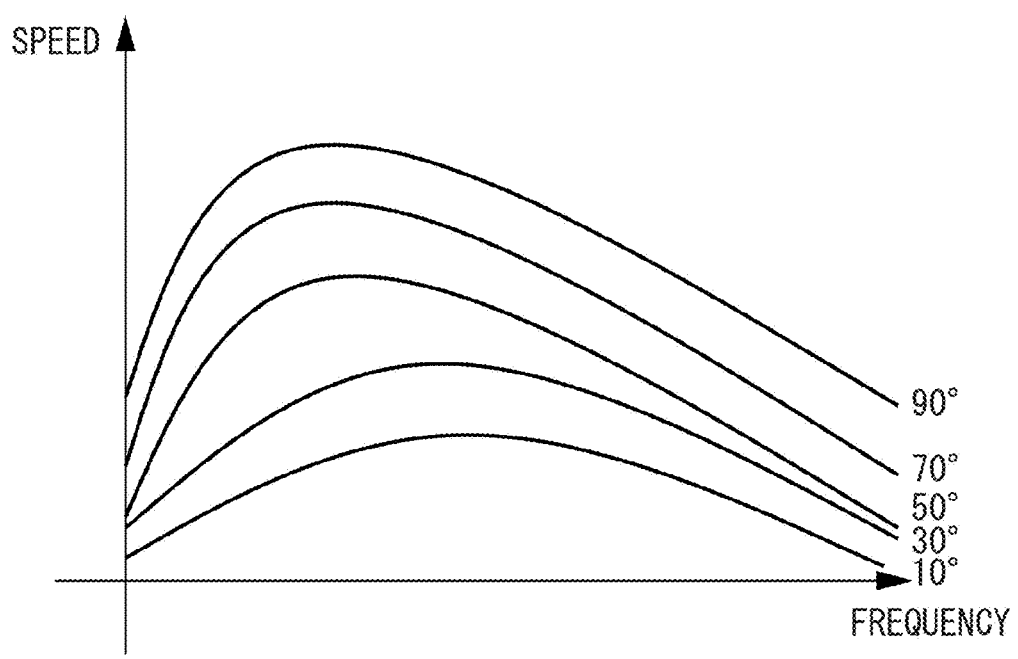
FIG. 4 illustrates the relationship of a speed to a phase difference and frequency of the vibrator.

FIG. 4 is a graph in which the horizontal axis represents the frequency of the alternating-current signal and the vertical axis represents the movement speed of the slider 102, when the phrase difference between the two alternating-current signals is changed to 10°, 30°, 50°, 70°, and 90°. As the frequency of the alternating-current signal is reduced from a certain frequency, the speed of the slider 102 is increased, and the speed of the slider 102 is reduced after reaching a certain frequency (generally, this is called "resonance frequency") as a peak. Further, as the phase difference is increased, the speed is increased accordingly. However, the speed is reduced after the phase difference becomes larger than 90°. When the phase difference is changed from 0° to a minus value, the slider 102 starts to move in the reverse direction. In this case, similarly, as the phase difference is reduced, the speed of the slider 102 in the reverse direction is increased until the phase difference reaches −90°.

Further, thus-configured actuator has such a characteristic that the speed of the slider 102 is increased as the amplitude of the alternating-current signal is increased, while the speed is reduced as the amplitude of the alternating-current signal is reduced. This means that the speed can be also controlled by changing the amplitude (voltage) of the alternating-current signal.

In this way, in the vibratory actuator, the speed can be controlled by changing the frequency of the two alternating-current signals applied to the piezoelectric element 203, and the speed can be also controlled by changing the phase difference between the alternating-current signals. This speed characteristic relative to frequency, amplitude, and phase difference varies according to vibrators depending on, for example, a difference in a shape of a vibrator or a pressure amount.

Therefore, when three vibrators are arranged as illustrated in FIG. 2, a variation occurs among the characteristics of the vibrators due to a mechanical backlash, a dimension error, and a difference in a magnetization amount of the slider 102. A plate spring (not illustrated) is provided to realize a uniform application of a pressure to the vibrators so that a variation is prevented from occurring therein. Nevertheless, it is difficult to make the characteristics of the vibrators uniform.

Next, a drive operation of the vibratory actuator will be described with reference to FIG. 5. A control signal of each vibrator is generated by a microcomputer 404, and is transmitted to a motor driver 401, 402, or 403. Further, voltage information of each vibrator is transmitted from the microcomputer 404 to a voltage adjustment unit 405, which generates a voltage signal of each vibrator. The motor driver 401, 402, or 403 generates an appropriate alternating-current signal from the control signal generated by the microcomputer 404 and the voltage signal generated by the voltage adjustment unit 405, and supplies the generated alternating-current signal to each vibrator. Generally, the microcomputer 404 generates a pulse width modulation (PWM) signal, and a voltage adjustment circuit adjusts it to an appropriate amplitude.

After that, an inductor-capacitor (LC) oscillation is generated in an electric circuit constituted by a coil and a capacitor component of the vibrator, thereby converting the PWM signal into an alternating-current signal. An input of this alternating-current signal into each of the vibrators 103, 104, and 105 causes a movement of the slider 102.

Figure 5:
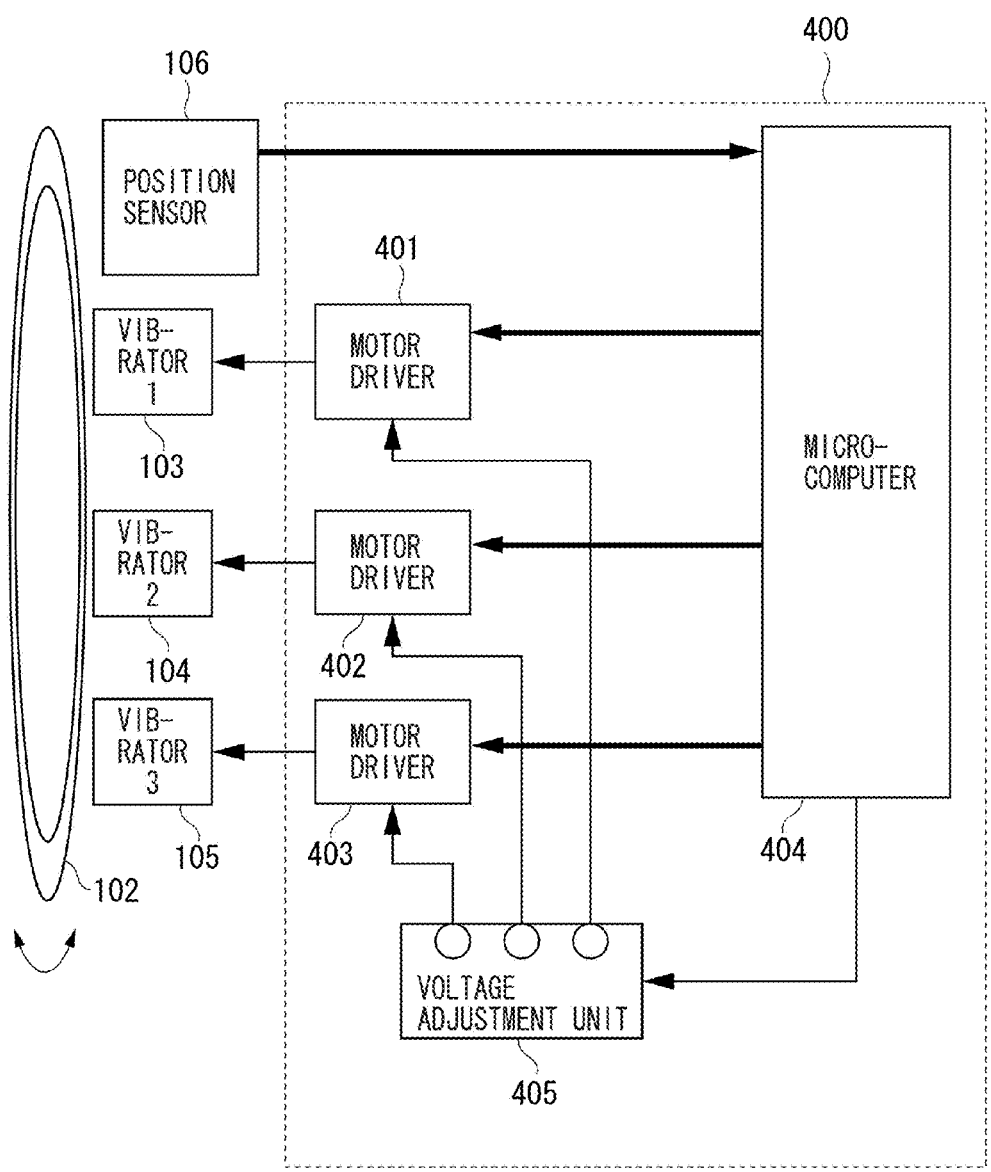
FIG. 5 is a block diagram illustrating a drive configuration of the actuator according to the exemplary embodiment of the present invention.

Referring to FIG. 5, a control apparatus 400 includes the microcomputer 404 (controller), the motor drivers 401, 402, and 403, and the voltage adjustment unit 405. The rotation amount of the slider 102 is read by the rotational position detection sensor 106, and this information is input into the microcomputer 404. The microcomputer 404 appropriately controls a servo gain and a phase based on this information to generate a control signal of each vibrator. Execution of this series of control processes causes the vibratory actuator to operate.

However, if an individual difference exists among the respective vibrators 103, 104, and 105, appropriate control is impossible, and, for example, slowdown of an operation, a reduction in a torque, and generation of abnormal noises may occur. Therefore, the vibratory actuator requires a work to adjust the individual difference. For this purpose, the characteristics of the vibrators 103, 104, and 105 should be adjusted respectively.

Figure 6:
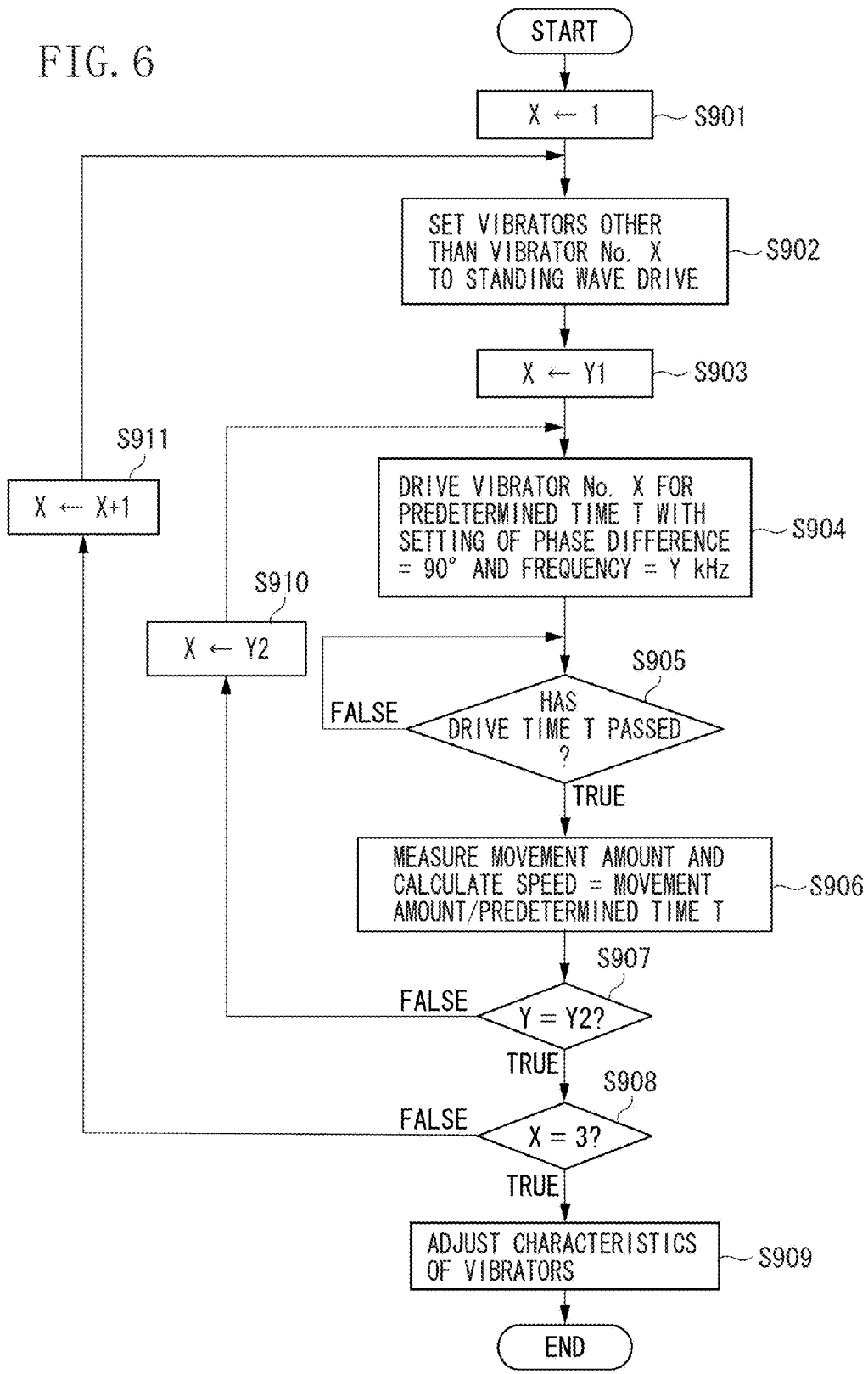
FIG. 6 is a flowchart according to the exemplary embodiment of the present invention.

The adjustment of the vibrators will be described with reference to the flowchart of FIG. 6. First, in step S901, 1 is set to X, thereby selecting one of the vibrators as a vibrator X (X is a number of a vibrator, assuming in this case that the selected vibrator is "vibrator 1"). Next, in step S902, the vibrators (vibrators 2 and 3) other than the vibrator selected in step S901 are set to standing wave drive ("standing wave" set at this time is a wave of an elliptic orbit in which an elliptic vibration has a lateral amplitude of 0, which corresponds to a phase difference of 0°). As a result, a force biasing each of the vibrators 2 and 3 toward the slider 103 can be canceled. In step S903, Y1 is set to Y ("Y" represents the frequency of a drive signal applied to a vibrator, and Y1 is a predetermined frequency), thereby setting a drive frequency.

In step S904, the vibrator identified as the vibrator X=1 is driven for a predetermined time T with the phase difference set to 90° and the drive frequency set to the predetermined frequency Y kHz. In step S905, time count is performed by using a timer function in the microcomputer 404, and it is determined whether the predetermined time T has passed. If the predetermined time T has passed (TRUE in step S905), the processing proceeds to step S906.

In step S906, the rotational position detection sensor 106 measures an amount that the slider 102 moves during the predetermined time T to obtain a movement amount. The speed of the slider 102 when the slider 102 is driven by one vibrator (vibrator 1) is calculated by dividing the obtained movement amount by the predetermined time T. In the present example, the speed of the slider 102 is detected based on the movement amount measured by the rotational position detection sensor 106 and the elapsed time during this movement. However, the speed of the slider 102 may be directly measured by a speed sensor. Alternatively, the speed of the slider 102 may be obtained by integrating an output of an acceleration sensor.

Next, in step S907, it is determined whether Y is Y2 (Y2 is a predetermined frequency). If Y is not Y2 (FALSE in step S907), the processing proceeds to step S910. In step S910, Y2 is set to the drive frequency Y, and the processing returns to step S904. After that, the same processing as the previous one is performed from steps S904 to S907, with Y2 set as the drive frequency Y this time. In the processing up to now, r the speed data can be acquired when the predetermined two drive frequencies (Y1 and Y2) are applied to one vibrator (vibrator 1).

Next, the processing proceeds to step S908, and then to step S911 in which 1 is added to the vibrator number X. Therefore, a measurement of the next vibrator (vibrator 2) is started, and the same processing is repeated from steps S902 to S908. The present exemplary embodiment uses three vibrators, and therefore the steps S902 to S908 are repeated three times. Then, the processing proceeds to step S909.

Alternatively, if a mechanical load is so large that the slider 102 cannot be rotated by only one vibrator, by driving two vibrators, for example, the vibrator 1 and the vibrator 2 while setting the vibrator 3 to the standing wave drive, the characteristic under the resultant force of the vibrator 1 and the vibrator 2 is obtained. Similarly, the resultant force of the vibrator 1 and the vibrator 2, the resultant force of the vibrator 2 and the vibrator 3, and the resultant force of the vibrator 3 and the vibrator 1 can be acquired by exchanging vibrators to be driven and a vibrator to be driven under the standing wave, and repeating the same processing three times. Then, the characteristic of each of the elements can be acquired by measuring the resultant force of the vibrators 1, 2, and 3, and subtracting the resultant force of two vibrators from the resultant force of the three vibrators.

The present example is described based on the actuator using the three vibrators, but data of each vibrator can be acquired by the similar processing even if the actuator includes more than three vibrators.

In the series of processes, speed data is obtained for each of the three vibrators (vibrator 1, vibrator 2, and vibrator 3) with the settings of the two drive frequencies (Y1 and Y1) and the phase difference 90°. After that, the processing proceeds to step S909, in which an adjustment is made so as to reduce an individual difference among the vibrators by adjusting any one or more of the amplitude (voltage) and drive frequency of an alternating-current signal to be supplied to each vibrator, and the phase difference between two alternating-current signals to be supplied to each vibrator based on the acquired characteristics of the vibrators.

Figure 7:
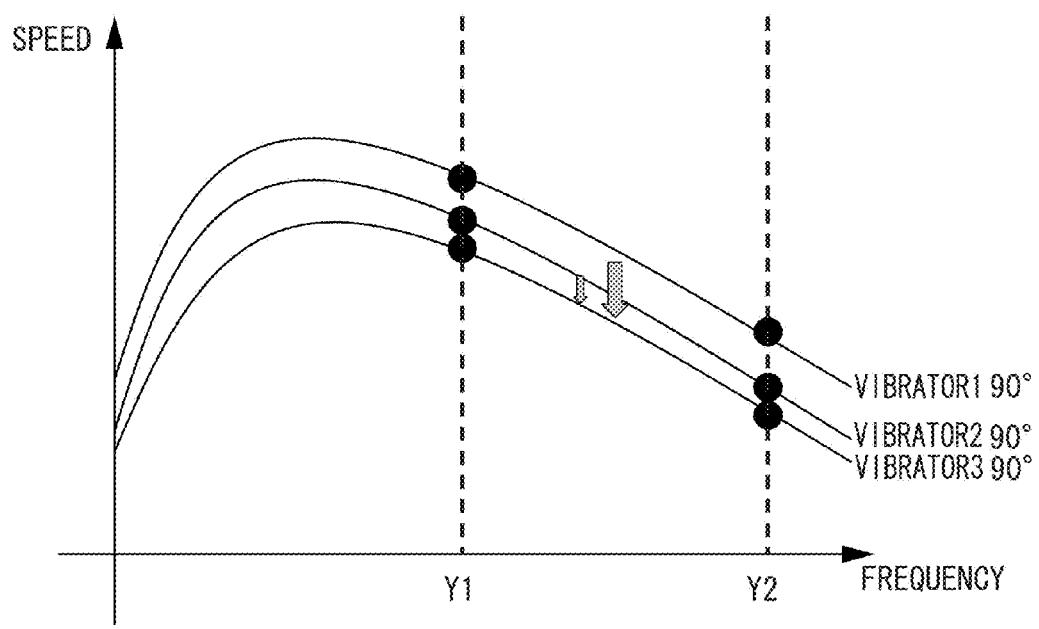
FIG. 7 illustrates the relationship of the speed to the frequency for each of three vibrators when the phase difference is set to 90°, and corrections applied thereto.

As an example, an adjustment based on a voltage will now be described. FIG. 7 illustrates the relationship of the speed to the frequency when 90° is set as the phase difference between two alternating-current signals supplied to each of the three vibrators.

The above-described flowchart only acquires the data when the vibrators are driven under the drive frequencies Y1 and Y2. However, by acquiring the data when the vibrators are driven under more than two drive frequencies, an estimation of a more accurate frequency-speed curve can be obtained as illustrated in FIG. 7. Further, the relationship between the voltage and the speed is obtained in advance by, for example, measuring the relationship between the voltage and the speed. Then, the characteristics of the three vibrators are set to be uniform by reducing the voltages to the vibrators 1 and 2 so that the characteristics of the vibrators 1 and 2 can match the characteristic of the vibrator 3 which has a smallest output, with reference to the relationship between the voltage and the speed. The vibrator which has a smallest output means a vibrator providing a lowest maximum speed (the speed at the resonance frequency), or a vibrator providing a lowest maximum speed in a usable frequency region.

In the present example, the vibrators 1 and 2 are adjusted to the vibrator 3 which has a smallest output. However, the vibrators 2 and 3 may be adjusted to the vibrator 1, or the vibrators 3 and 1 may be adjusted to the vibrator 2. Alternatively, all of the vibrators 1 to 3 may be adjusted so that they have a predetermined characteristic. It should be noted that adjusting the vibrators 2 and 3 to the vibrator 1 by increasing the voltages supplied to the vibrators 2 and 3 requires an increase in power consumption. Therefore, if there will be no problem with drive of the actuator and the performance of the product, it may be further preferable in terms of power consumption to make an adjustment according to the vibrator having a smallest output, or according to the characteristic of a more reduced voltage.

Further, the voltage adjustment unit 405 adjusts the voltages, but an adjustment among the vibrators can be also made by adjusting a power rate of a signal output from the microcomputer 404 to the vibrators 103, 104, and 105.

Figure 9:
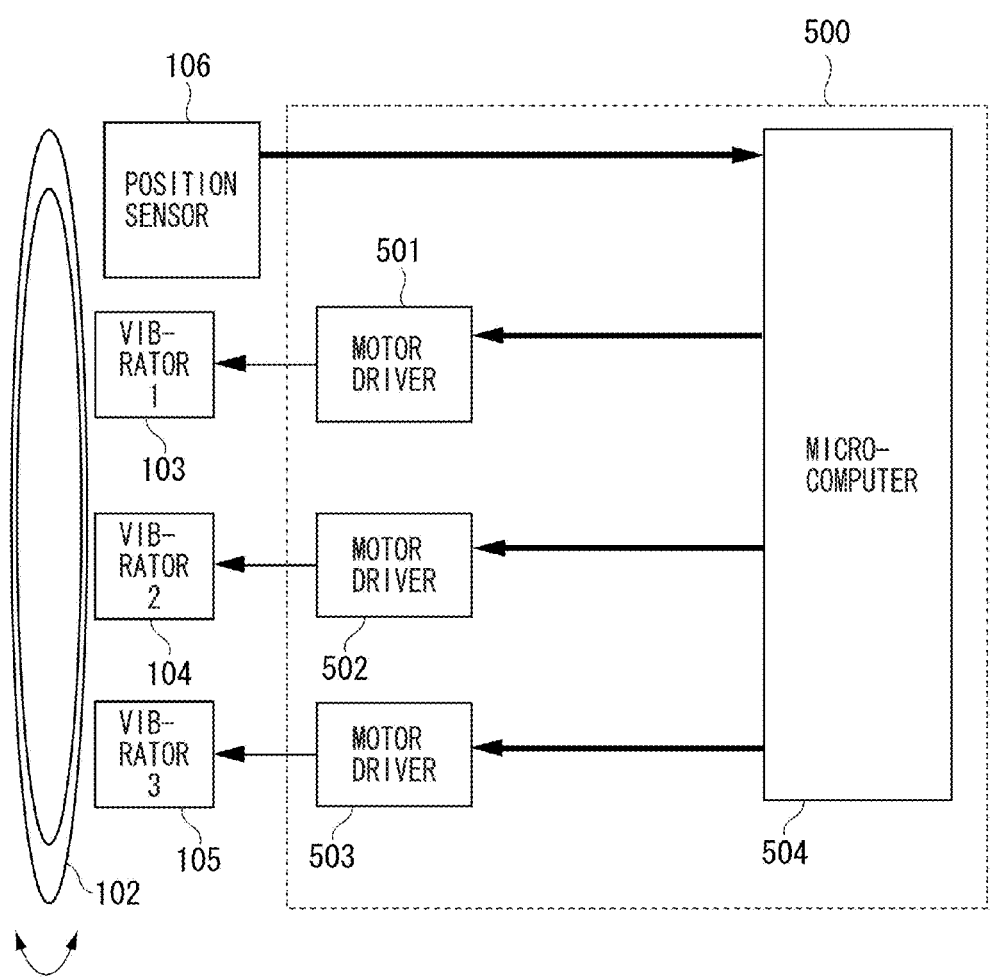
FIG. 9 is a block diagram illustrating another drive configuration of the actuator according to the exemplary embodiment of the present invention.

Further, FIG. 9 illustrates a configuration in which the microcomputer side generates a drive signal of each vibrator. This configuration enables a microcomputer 504 to adjust a drive signal of each vibrator to achieve an adjustment among the vibrators. Referring to FIG. 9, a control apparatus 500 includes the microcomputer 504, and motor drivers 501, 502, and 503.

The adjustment based on a voltage has been described in the above exemplary embodiment, but the shape of the frequency-speed curve can be also changed by adjusting the phase difference as illustrated in FIG. 4. Therefore, a difference among the characteristics of the vibrators can be also reduced by adjusting the phase difference.

Figure 8:
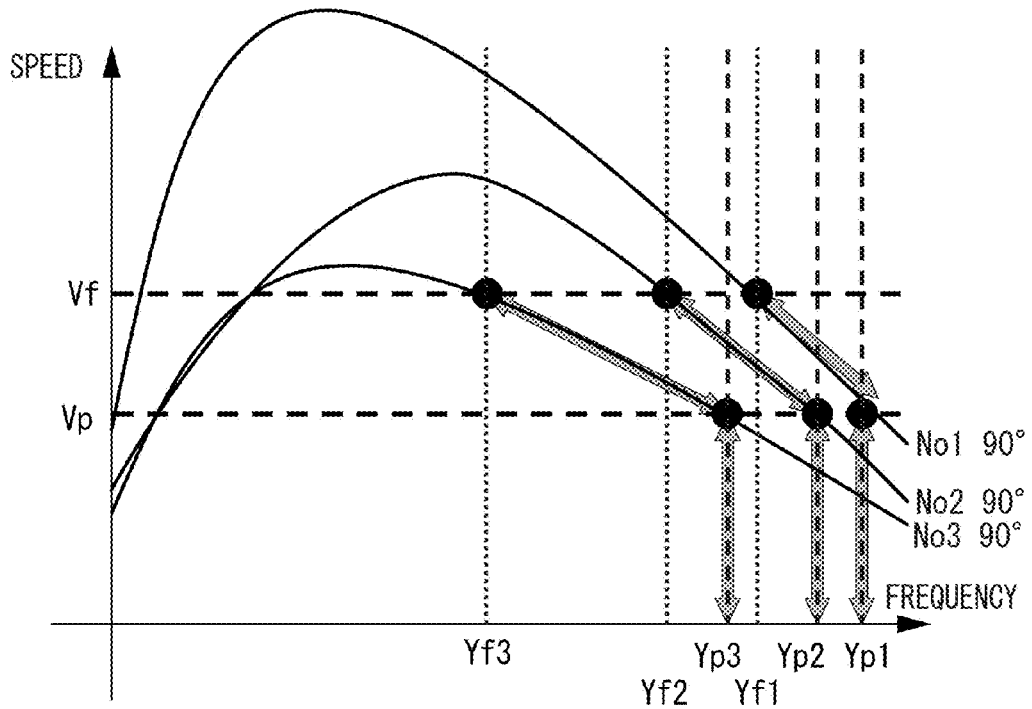
FIG. 8 illustrates the relationship of the speed to the frequency for each of the three vibrators when the phase difference is set to 90°, and corrections applied thereto.

When the vibrators have similarly shaped frequency-speed curves, it is easy to employ the above-described method of adjusting the voltage and the phase difference. However, as illustrated in FIG. 8, frequency-speed curves of the vibrators may have largely different shapes. An adjustment method in this case will be now described.

First, the speed control is performed by individually changing phase control when the speed is low. The vibrator 1 reaches the speed Vp when the phase difference is 90° and the drive frequency is Yp1. Therefore, the phase control is performed with Yp1 set as the drive frequency, and the speed is controlled from 0 to Vp by changing the phase difference from 0° to 90°. Next, the speed is controlled from Vp to Vf by changing the drive frequency from Yp1 to Yf1, which is a frequency corresponding to the speed Vf, while the phase difference is maintained at 90°.

Similarly, for the vibrator 2, the phase control is performed with use of the drive frequency Yp2 at which the vibrator 2 reaches the speed Vp with the setting of the phrase difference 90°, and the speed is controlled from 0 to Vp by changing the phase difference from 0° to 90°. Next, the speed is controlled from Vp to Vf by changing the drive frequency from Yp2 to Yf2, which is a frequency corresponding to the speed Vf, while the phase difference is maintained at 90°.

Similarly, for the vibrator 3, the phase control is performed with use of the drive frequency Yp3 at which the vibrator 3 reaches the speed Vp with the setting of the phrase difference 90°, and the speed is controlled from 0 to Vp by changing the phase difference from 0° to 90°. Next, the speed is controlled from Vp to Vf by changing the drive frequency from Yp3 to Yf3, which is a frequency corresponding to the speed Vf, while the phase difference is maintained at 90°.

Thus, in the vibrators 1, 2, and 3, the phase difference control and the frequency control are used in combination to make the speeds caused by the vibrators 1, 2, and 3 uniform, which enables, for example, the speed control from 0 to Vf. This method can make the characteristics of the vibrators 1, 2, and 3 uniform, even if the vibrators 1, 2, and 3 do not have similarly shaped frequency-speed curves.

Further, the phase difference control may be replaced with voltage control.

In this way, according to the present exemplary embodiment, in the actuator configured to drive one movable object with use of the plurality of vibrators, it is possible to adjust a variation among the individual vibrators and a variation due to an environmental change to stably drive the actuator with a simple structure and an easy process, even after the slider and the plurality of vibrators are already installed into the actuator.

Figure 10:
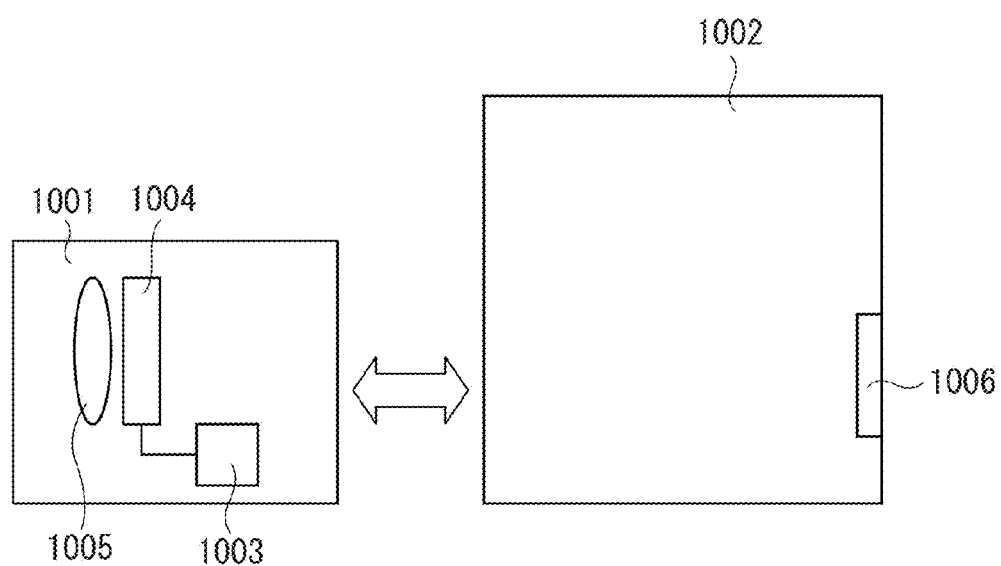
FIG. 10 illustrates an interchangeable-lens camera.

FIG. 10 illustrates an interchangeable-lens camera. This interchangeable-lens camera generally includes a lens unit 1001 and a camera unit 1002. The units 1001 and 1002 can be attached to and detached from each other via a mount unit having an electrical contact. The lens unit 1001 is configured in such a manner that the power of the lens unit 1001 is turned on when the lens unit 1001 is attached to the camera unit 1002. The lens unit 1001 and the camera unit 1002 contain built-in microcomputers, which enable various operations through communication between them.

A light flux incident from an outside is transmitted through the lens unit 1001, and is imaged at an image sensor 1006 disposed in the camera unit 1002. An electrical video signal, which results from a conversion into an electric signal by the image sensor 1006, undergoes an appropriate signal processing treatment, and then undergoes recording processing and video output processing.

A lens 1005, which functions to guide a light flux to the image sensor 1006, is disposed in the lens unit 1001. Further, a lens barrel as illustrated in FIG. 1 is provided to move the lens 1005. The lens barrel is driven by a vibratory actuator 1003 to move the lens 1005. The vibratory actuator 1003 is adjusted by the microcomputer 1004 with use of the above-described method. The adjustment of the vibrators may be made before shipping of the lens unit 1001, but the vibratory actuator may be configured in such a manner that the adjustment of the vibrators is made automatically when the lens unit 1001 is attached to the camera unit 1002 and the power of the lens unit 1001 is turned on. If the vibratory actuator is configured in this way, it is possible to deal with aging or a temperature change.

Further, the present exemplary embodiment is applicable to not only an interchangeable-lens camera but also other optical apparatus such as a lens-integrated camera and a binocular. Further, the present exemplary embodiment is also applicable to not only a still camera but also a video camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-132134 filed Jun. 9, 2010, which is hereby incorporated by reference herein in its entirety.

What is claimed is:

1. A control apparatus configured to control an actuator, which moves one driven member by a plurality of vibrators, by supplying two alternating-current signals to each vibrator of the actuator, the control apparatus comprising:
a controller configured to acquire a speed of the driven member at the time of driving one or more vibrator(s) of the plurality of vibrators while setting the remaining vibrators to standing wave drive, acquire a speed characteristic of the driven member corresponding to the frequency of the alternating-current signal with respect to the vibrator(s) based on the acquired speed and the frequency of the alternating-current signal supplied to the vibrator(s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

2. The control apparatus according to claim 1, wherein the controller changes the driven vibrator(s) of the plurality of vibrators, and then acquires the speed of the driven member.

3. The control apparatus according to claim 1, wherein the controller acquires the speed characteristics of the driven member with respect to at least two different frequencies for each of the plurality of vibrators.

4. The control apparatus according to claim 1, wherein the controller acquires the speed characteristic of the driven member with respect to the frequency of the alternating-current signal when a phase difference between the supplied two alternating-current signals is a predetermined phase difference, for each of the plurality of vibrators.

5. The control apparatus according to claim 1, wherein the plurality of vibrators are respectively provided with the two alternating-current signals of a same frequency.

6. The control apparatus according to claim 1, wherein the controller adjusts the other vibrators relative to a vibrator which has such a characteristic that a maximum speed thereof is lowest among the plurality of vibrators.

7. The control apparatus according to claim 1, wherein the controller adjusts the other vibrators relative to a vibrator which has such a characteristic that a maximum speed thereof in a usable frequency region is lowest among the plurality of vibrators.

8. An actuator comprising:
a driven member;
a plurality of vibrators configured to move the driven member; and
a control apparatus configured to control an actuator to move the driven member by supplying two alternating-current signals to each of the plurality of vibrators, the control apparatus including a controller configured to acquire a speed of the driven member at the time of driving one or more vibrator (s) of the plurality of vibrators while setting the remaining vibrators to standing wave drive, acquire a speed characteristic of the driven member corresponding to the frequency of the alternating-current signal with respect to the vibrator (s) based on the acquired speed and the frequency of the alternating-current signal supplied to the vibrator (s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

9. A lens unit configured to be attached to a camera unit, the lens unit comprising:
an actuator configured to move a lens included in the lens unit, the actuator including a driven member, a plurality of vibrators configured to move the driven member, and a control apparatus configured to control an actuator to move the driven member by supplying two alternating-current signals to each of the plurality of vibrators, the control apparatus including a controller configured to acquire a speed of the driven member at the time of driving one or more vibrator(s) of the plurality of vibrators while setting the remaining vibrators to standing wave drive, acquire a speed characteristic of the driven member corresponding to the frequency of the alternating-current signal with respect to the vibrator(s) based on the acquired speed and the frequency of the alternating-current signal supplied to the vibrator(s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

10. An optical apparatus comprising:
an image sensor; and
a lens unit configured to guide light to the image sensor, the lens unit including an actuator configured to move a lens included in the lens unit, the actuator including a driven member, a plurality of vibrators configured to move the driven member, and a control apparatus configured to control an actuator to move the driven member by supplying two alternating-current signals to each of the plurality of vibrators, the control apparatus including a controller configured to acquire a speed of the driven member at the time of driving one or more vibrator (s) of the plurality of vibrators while setting the remaining vibrators to standing wave drive, acquire a speed characteristic of the driven member corresponding to the frequency of the alternating-current signal with respect to the vibrator(s) based on the acquired speed and the frequency of the alternating-current signal supplied to the vibrator(s) at the time of the acquisition of the speed, and reduce a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator, based on the acquired characteristic.

11. A method for adjusting an actuator configured to move one driven member by a plurality of vibrators, the method comprising:
acquiring a speed of the driven member at the time of driving one or more vibrator(s) of the plurality of vibrators while setting the remaining vibrators to standing wave drive;
acquiring a speed characteristic of the driven member corresponding to the frequency of the alternating-current signal with respect to the vibrator(s), based on the acquired speed and the frequency of the alternating-current signal supplied to the vibrator(s) at the time of driving the vibrator(s) when the speed is acquired; and
reducing a difference in the characteristic among the plurality of vibrators by adjusting at least one of an amplitude of an alternating-current signal to be supplied to the vibrator, a frequency of an alternating-current signal to be supplied to the vibrator, and a phase difference between two alternating-current signals to be supplied to the vibrator based on the acquired characteristic.

12. The method for adjusting the actuator according to claim 11, wherein the acquiring the speed of the driven member includes changing the vibrator(s) to be driven to acquire the speed of the driven member.

* * * * *